(12) United States Patent
Dou et al.

(10) Patent No.: US 12,543,228 B2
(45) Date of Patent: Feb. 3, 2026

(54) INTER-DEVICE COMMUNICATION METHOD, RELATED DEVICE, AND SYSTEM

(71) Applicant: HUAWEI TECHNOLOGIES CO., LTD., Guangdong (CN)

(72) Inventors: Fenghui Dou, Beijing (CN); Haibo Xu, Beijing (CN); Xiaoyan Duan, Shenzhen (CN); Chuting Yao, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 678 days.

(21) Appl. No.: 17/767,288

(22) PCT Filed: Aug. 26, 2020

(86) PCT No.: PCT/CN2020/111197
§ 371 (c)(1),
(2) Date: Apr. 7, 2022

(87) PCT Pub. No.: WO2021/068664
PCT Pub. Date: Apr. 15, 2021

(65) Prior Publication Data
US 2022/0369395 A1     Nov. 17, 2022

(30) Foreign Application Priority Data
Oct. 9, 2019   (CN) .......................... 201910956570.0

(51) Int. Cl.
*H04W 76/14* (2018.01)
*H04W 4/30* (2018.01)
*H04W 76/11* (2018.01)

(52) U.S. Cl.
CPC ............. *H04W 76/14* (2018.02); *H04W 4/30* (2018.02); *H04W 76/11* (2018.02)

(58) Field of Classification Search
CPC ........ H04W 76/14; H04W 4/30; H04W 76/11
(Continued)

(56) References Cited

U.S. PATENT DOCUMENTS 9,706,340 B2 * 7/2017 Kim ...................... H04W 4/029
2006/0239190 A1 10/2006 Kumar et al.
(Continued)

FOREIGN PATENT DOCUMENTS

| CN | 1753366 A | 3/2006 |
| CN | 103634172 A | 3/2014 |

(Continued)

OTHER PUBLICATIONS

3GPP TR 22.842 V17.1.0 (Sep. 2019) (Year: 2019).*
(Continued)

*Primary Examiner* — Intekhaab A Siddiquee
(74) *Attorney, Agent, or Firm* — WOMBLE BOND DICKINSON (US) LLP

(57) ABSTRACT

Embodiments of this application describe an inter-device communication method, a related device, and a system. The method includes a first device sending a first message. The first message includes one or more of the following parameters: a first parameter, a second parameter, and a third parameter. The first parameter is used to indicate that the first message is a message for announcing provision of an interactive business service. The second parameter is used to indicate an identifier corresponding to the interactive business service that can be provided by the first device. The third parameter is used to indicate a processing capability that can be provided by the first device for the interactive business service.

14 Claims, 2 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2009/0271268 A1 | 10/2009 | Zhao et al. | |
| 2018/0368052 A1 | 12/2018 | Jia et al. | |
| 2022/0353931 A1* | 11/2022 | Yang | H04W 76/14 |

FOREIGN PATENT DOCUMENTS

| | | |
|---|---|---|
| CN | 104105155 A | 10/2014 |
| CN | 106211810 B | 7/2019 |

OTHER PUBLICATIONS

3GPP TR 23.786 V16.1.0 (Jun. 2019), 3rd Generation Partnership Project; Technical Specification Group Services and System Aspects; Study on architecture enhancements for the Evolved Packet System (EPS) and the 5G System (SGS) to support advanced V2X services (Release 16), 119 pages, XP051753967.

3GPP TR 33.836 V0.3.0 (Aug. 2019), 3rd Generation Partnership Project; Technical Specification Group Services and System Aspects; Study on Security Aspects of 3GPP support for Advanced V2X Services (Release 16), 36 pages, XP051784629.

Bgpp TS 23.287 V16.0.0 (Sep. 2019), 3rd Generation Partnership Project; Technical Specification Group Services and System Aspects; Architecture enhancements for 5G System (SGS) to support Vehicle-to-Everything (V2X) services (Release 16), 49 pages, XP051784662.

3GPP TS 24.303 V12.0.0 (Sep. 2014), 3rd Generation Partnership Project; Technical Specification Group Core Network and Terminals; Mobility management based on Dual-Stack Mobile IPV6; Stage 3(Release 12), Sep. 2014, total 52 pages.

3GPP TS 24.334 V0.1.0 (Apr. 2014); 3rd Generation Partnership Project; Technical Specification Group Core Network and Terminals; Proximity-services (ProSe) User Equipment (UE) to Proximity-services (ProSe) Function Protocol aspects; Stage 3(Release 12), total 25 pages.

3GPP TR 22.842 V17.1.0 (Sep. 2019), 3rd Generation Partnership Project; Technical Specification Group Services and System Aspects;Study on Network Controlled Interactive Services(Release 17), 29 pages.

Huawei Device, Use case update of section 5.2, 3GPP TSG-SA WG1 Meeting #87 S1-192762, Sophia, France, Aug. 19-23, 2019 ,5 pages.

Huawei Technologies Co., Ltd, Huawei Device, Updates to rendering architecture, 3GPP TSG SA WG-4 Meeting #105 , S4-190988Ljubljana, Slovenia, Aug. 12-16, 2019 , 3 pages.

E. Guttman et al:"Service Location Protocol, Version 2", Network Working Group, Request for Comments: 2608, Jun. 1999, total 55 pages.

* cited by examiner

INTER-DEVICE COMMUNICATION METHOD, RELATED DEVICE, AND SYSTEM

This application is a National Stage of International Application No. PCT/CN2020/111197, filed on Aug. 26, 2020, which claims priority to Chinese Patent Application No. 201910956570.0, filed on Oct. 9, 2019, both of which are incorporated herein by reference in their entireties.

TECHNICAL FIELD

This application relates to the communication field, and in particular, to an inter-device communication method, a related device, and a system.

BACKGROUND

Virtual reality (VR) is a simulation system for creating and experiencing a virtual world. It generates a simulated environment through a computer, so that a user can obtain experience in a plurality of aspects such as an auditory sensation, a tactile sensation, and motion. A head mounted device (HMD) is a core visual device in the VR. The user watches content in a VR video through the HMD. Because the VR video relates to technologies such as rendering, compression, and decompression, the HMD is large in size and heavy in weight, which brings much inconvenience to the user's watching.

Through optimization, some functions (for example, functions such as decompression and rendering) of an HMD may be transferred from the HMD to user equipment (UE), for example, a mobile phone, to reduce the weight and the size of the head mounted device. In this way, the head mounted device is lightweight. The user may use the lightweight head mounted device to watch a VR video stored in the user equipment (for example, a smartphone), or watch a VR video transmitted from a cloud through rendering and forwarding of the smartphone. Therefore, watching of the VR video relates to data exchange between two devices: the lightweight head mounted device and the smartphone. Before the data exchange is implemented, device discovery needs to be performed first, that is, the devices communicate with each other.

A proximity service (ProSe) mainly studies discovery and communication between neighboring UEs. Device to device (D2D) communication is a focus of attention in the industry. In the D2D communication, two parties directly send data within a short range. A short-range feature of the D2D communication enables the two parties that are to communicate with each other to implement communication at low transmit power. However, how devices discover each other and initiate a D2D connection is a basis of the D2D communication.

To improve network transmission efficiency and reduce UE power consumption, a PC5 interface is used between UEs in the D2D communication. The PC5 interface is used for discovery and communication between D2D devices. It should be noted that the PC5 interface is also used for communication between the UE and a relay.

In the conventional technology, during device discovery, the ProSe is mainly for discovering a relay UE that provides a relay service. In a VR scenario, the smartphone mainly provides services such as rendering and compression for the HMD to watch a VR video, and needs to provide an ultra-high-speed data transmission capability on the PC5 interface. These are essentially video proxy and rendering service processing rather than a relay service. Therefore, the relay UE discovered in the conventional technology cannot meet a requirement of an interactive business service, for example, the VR.

Therefore, how a device, for example, an HMD, discovers user equipment, for example, a smartphone, that can provide a VR video service for the device is a problem needing to be resolved.

SUMMARY

Embodiments of this application provide an inter-device communication method, a related device, and a system, so that interaction between devices can be more matched.

According to a first aspect, an embodiment of this application provides an inter-device communication method. The method includes: A first device sends a first message. The first message includes one or more of the following parameters: a first parameter, a second parameter, and a third parameter. The first parameter is used to indicate that the first message is a message for announcing provision of an interactive business service. The second parameter is used to indicate an identifier corresponding to the interactive business service that can be provided by the first device. The third parameter is used to indicate one or more of a processing capability that can be provided by the first device for the interactive business service or a processing capability of the first device for the interactive business service. A second device receives the first message. The second device determines, based on the first message, whether the first device can provide the interactive business service for the second device. The second device communicates with the first device when the second device determines that the first device can provide the interactive business service for the second device.

According to the technical solution provided in this embodiment of this application, the first device that communicates with the second device is a device that can provide a service for an interactive business for the second device. This facilitates more matched interaction between the devices.

According to a second aspect, an embodiment of this application provides an inter-device communication method, applied to a first device. The method includes: The first device sends a first message. The first message includes one or more of the following parameters: a first parameter, a second parameter, and a third parameter. The first parameter is used to indicate that the first message is a message for announcing provision of an interactive business service. The second parameter is used to indicate an identifier corresponding to the interactive business service that can be provided by the first device. The third parameter is used to indicate one or more of a processing capability that can be provided by the first device for the interactive business service or a processing capability of the first device for the interactive business service.

In some possible embodiments, the first message further includes a quality of service (QoS) parameter. The QoS parameter is used to indicate a QoS capability that can be provided by the first device on a bypass interface. The bypass interface is an interface between the first device and a second device.

In some possible embodiments, the first message further includes an identifier of a first application. The identifier of the first application is used to indicate that the first terminal can provide the interactive business service for the first application.

In some possible embodiments, the method further includes: The first device receives a second message sent by a second device. The second message is used by the second device to request to establish a connection to the first device. The second message includes one or more of the following: a fourth parameter, where the fourth parameter is used to indicate a processing capability required by the second device for the interactive business service; and an identifier of a second application, where the identifier of the second application is used to indicate that the second device requests to establish a connection for the second application. The first device sends a third message to the second device. The third message is used by the first device to accept establishment of the connection to the second device.

In some possible embodiments, the method further includes: The first device receives the second parameter sent by a network device.

In some possible embodiments, the method further includes: The first device sends a first request message to the network device. The first request message is used to obtain, from the network device, the processing capability that can be provided by the first device for the interactive business service.

According to a third aspect, an embodiment of this application provides an inter-device communication method. The method is applied to a second device, and the method includes:

the second device receives a first message, and the second device determines, based on the first message, whether a first device can provide an interactive business service for the second device; and the second device communicates with the first device when the second device determines that the first device can provide the interactive business service for the second device, where the first message includes one or more of the following parameters: a first parameter, a second parameter, and a third parameter; the first parameter is used to indicate that the first message is a message for announcing provision of an interactive business service; the second parameter is used to indicate an identifier corresponding to the interactive business service that can be provided by the first device; and the third parameter is used to indicate one or more of a processing capability that can be provided by the first device for the interactive business service or a processing capability of the first device for the interactive business service.

In some possible embodiments, the first message further includes a quality of service (QoS) parameter. The QoS parameter is used to indicate a QoS capability that can be provided by the first device on a bypass interface. The bypass interface is an interface between the first device and the second device.

In some possible embodiments, the first message further includes an identifier of a first application. The identifier of the first application is used to indicate that the first terminal can provide the interactive business service for the first application.

In some possible embodiments, that the second device determines, based on the first message, that a first device can provide an interactive business service for the second device includes one or more of the following:

the second device determines, based on the first parameter, that the first message is a message for announcing provision of the interactive business service;
the second device determines, based on the second parameter, that the interactive business service that can be provided by the first device matches an interactive business service required by the second device;
the second device determines, based on the third parameter, that the processing capability that can be provided by the first device for the interactive business service matches a processing capability required by the second device for the interactive business service;
the second device determines, based on the QoS parameter, that the QoS capability that can be provided by the first device on the bypass interface matches a QoS capability required by the second device on the bypass interface; and
the second device determines, based on the identifier of the first application, that an application for which the first device can provide an interactive business service matches an application of the interactive business service required by the second device.

In some possible embodiments, the method further includes:

the second device sends a second message to the first device, where the second message is used by the second device to request to establish a connection to the first device; and the second message includes one or more of the following: a fourth parameter, where the fourth parameter is used to indicate a processing capability required by the second device for the interactive business service; and an identifier of a second application, where the identifier of the second application is used to indicate that the second device requests to establish a connection for the second application; and
the first device sends a third message to the second device, where the third message is used by the first device to accept establishment of the connection to the second device.

In some possible embodiments, the method further includes: The second device sends a second request message to a network device. The second request message is used to obtain, from the network device, the required processing capability for the interactive business service.

In some possible embodiments, the method further includes: The second device receives a filter sent by the network device. The second device receives the second parameter sent by the network device. The second device determines, based on the filter, that the second parameter matches the filter.

According to a fourth aspect, an embodiment of this application provides an inter-device communication method. The method includes: A first device sends a first message. The first message includes one or more of the following parameters: a first parameter, a second parameter, and a third parameter. The first parameter is used to indicate that the first message is a message for requesting to be provided an interactive business service. The second parameter is used to indicate an identifier corresponding to the interactive business service required by the first device. The third parameter is used to indicate a processing capability required by the first device for the interactive business service. A second device receives the first message. The second device determines, based on the first message, whether the second device can provide the interactive business service for the first device. The second device sends a second message to the first device when the second device determines that the second device can provide the interactive business service for the first device.

According to a fifth aspect, an embodiment of this application provides an inter-device communication method. The method includes: A first device sends a first message. The first message includes one or more of the following parameters: a first parameter, a second parameter, and a third parameter. The first parameter is used to indicate that the first message is a message for requesting to be provided an interactive business service. The second parameter is used to indicate an identifier corresponding to the interactive business service required by the first device. The third parameter is used to indicate a processing capability required by the first device for the interactive business service.

In some possible embodiments, the first message further includes a quality of service (QoS) parameter. The QoS parameter is used to indicate a QoS capability required by the first device on a bypass interface. The bypass interface is an interface between the first device and a second device.

In some possible embodiments, the first message further includes an identifier of a first application. The identifier of the first application is used to indicate that the interactive business service required by the first terminal is provided for the first application.

In some possible embodiments, the method further includes:
  the first device sends a third message to the second device, where the third message is used to indicate that the first device requests to establish a connection to the second device; the third message includes one or more of the following: a fourth parameter and an identifier of a second application; the fourth parameter is used to indicate the processing capability required by the first device for the interactive business service; and the identifier of the second application is used to indicate that the first device requests to provide an interactive business service for the second application; and
  the second device sends a fourth message to the first device, where the fourth message is used by the second device to accept establishment of the connection to the first device.

According to a sixth aspect, an embodiment of this application provides an inter-device communication method. The method includes: A second device receives a first message. The second device determines, based on the first message, whether the second device can provide an interactive business service for a first device. The first message is sent by the first device, and the first message includes one or more of the following parameters: a first parameter, a second parameter, and a third parameter. The first parameter is used to indicate that the first message is a message for requesting to be provided an interactive business service. The second parameter is used to indicate an identifier corresponding to the interactive business service required by the first device. The third parameter is used to indicate a processing capability required by the first device for the interactive business service. The second device sends a second message to the first device when the second device determines that the second device can provide the interactive business service for the first device.

In some possible embodiments, the first message further includes a quality of service (QoS) parameter. The QoS parameter is used to indicate a QoS capability required by the first device on a bypass interface. The bypass interface is an interface between the first device and the second device.

In some possible embodiments, the first message further includes an identifier of a first application. The identifier of the first application is used to indicate that the interactive business service required by the first terminal is provided for the first application.

In some possible embodiments, that the second device determines, based on the first message, whether the second device can provide an interactive business service for a first device includes one or more of the following:
  the second device determines, based on the first parameter, that the first message is a message for requesting to be provided the interactive business service;
  the second device determines, based on the second parameter, that an interactive business service that can be provided by the second device matches the interactive business service required by the first device;
  the second device determines, based on the third parameter, that a processing capability that can be provided by the second device for the interactive business service matches the processing capability required by the first device for the interactive business service;
  the second device determines, based on the QoS parameter, that a QoS capability that can be provided by the second device on the bypass interface matches the QoS capability required by the first device on the bypass interface; and
  the second device determines, based on the identifier of the first application, that an application for which the second device can provide the interactive business service matches an application of the interactive business service required by the first device.

In some possible embodiments, the method further includes: The second device sends the second message to the first device. The second message includes a fourth parameter. The fourth parameter is used to indicate that the second message is a response message indicating that the interactive business service can be provided.

In some possible embodiments, the method further includes: The second device sends a fourth message to the first device. The fourth message is used by the second device to accept establishment of a connection to the first device.

According to a seventh aspect, an embodiment of this application provides an inter-device communication method. The method includes: A first device sends a first message. The first message is used to request to establish a connection to a second device. The first message includes one or more of the following parameters: a first parameter and a second parameter. The first parameter is used to indicate to request to provide an interactive business service. The second parameter is used to indicate a processing capability that the second device needs to have for the interactive business service. The first device receives a second message. The second message is used to indicate that the second device accepts establishment of the connection to the first device.

In some possible embodiments, the first message further includes one or more of the following parameters: a third parameter and an identifier of a first application. The third parameter is used to indicate an identifier corresponding to the interactive business service required by the first device. The identifier of the first application is used to indicate that the interactive business service is provided for the first application.

In some possible embodiments, the second message further includes one or more of the following parameters: a fourth parameter and an identifier of a second application. The fourth parameter indicates a processing capability that can be provided by the second device for the interactive business service. The identifier of the second application is used to indicate that the second device can provide the interactive business service for the second application.

In some possible embodiments, the method further includes: The first device sends a third message when determining, based on the second message, to establish the connection to the second device.

In some possible embodiments, the method further includes: The first device sends a first request message to a first network device. The first request message includes a processing capability that needs to be provided for the interactive business service. The first device receives the first parameter sent by the network device. The first device sends a first broadcast message. The first broadcast message includes the first parameter. The second device sends a second request message to a second network device. The second request message includes a processing capability that can be provided for the interactive business service. The second device receives a first filter sent by the second network device. The second device receives the first broadcast message, and determines that the first parameter matches the first filter. The second device communicates with the first device.

According to an eighth aspect, an embodiment of this application provides an inter-device communication method. The method includes: A first device sends a first request message to a first network device. The first request message includes a processing capability that can be provided for an interactive business service. The first device receives a first parameter sent by the first network device. The first parameter is a processing capability that can be provided by the first device for the interactive business service. The first device sends a first broadcast message. The first broadcast message includes the first parameter. A second device sends a second request message to a second network device. The second request message includes a required processing capability for the interactive business service. The second device receives a first filter sent by the second network device. The second device receives the first broadcast message, and determines that the first parameter matches the first filter. The second device communicates with the first device.

According to a ninth aspect, an embodiment of this application provides an inter-device communication method. The method includes: A first device sends a first request message to a first network device. The first request message includes one or more of a processing capability for an interactive business service, a required processing capability for the interactive business service, or a processing capability that can be provided for the interactive business service. The first device receives a second parameter sent by the first network device. The first device sends a first broadcast message. The first broadcast message includes the second parameter. A second device receives the first broadcast message, and determines, based on the second parameter, to communicate with the first device.

In some possible embodiments, the method further includes: The second device sends a second request message to a second network device. The second request message includes one or more of a processing capability for an interactive business service, a processing capability that can be provided for the interactive business service, or a required processing capability for the interactive business service.

In some possible embodiments, the method further includes: The second device receives a third parameter sent by a second network device, and the second device determines, based on the third parameter and the second parameter, to communicate with the first device.

According to a tenth aspect, an embodiment of this application provides a communication system, including a first device and a second device. The first device is configured to send a first message. The first message includes one or more of the following parameters: a first parameter, a second parameter, and a third parameter. The first parameter is used to indicate that the first message is a message for announcing provision of an interactive business service. The second parameter is used to indicate an identifier corresponding to the interactive business service that can be provided by the first device. The third parameter is used to indicate one or more of a processing capability that can be provided by the first device for the interactive business service or a processing capability of the first device for the interactive business service. The second device is configured to receive the first message. The second device determines, based on the first message, whether the first device can provide the interactive business service for the second device. The second device communicates with the first device when the second device determines that the first device can provide the interactive business service for the second device.

According to an eleventh aspect, an embodiment of this application provides a device, including a processor, an input device, an output device, and a memory. The processor, the input device, the output device, and the memory are connected to each other. The memory is configured to store a computer program. The computer program includes program instructions. The processor is configured to invoke the program instructions, to perform the method according to any one of the second aspect or the possible embodiments of the second aspect.

According to a twelfth aspect, an embodiment of this application provides a device, including a processor, an input device, an output device, and a memory. The processor, the input device, the output device, and the memory are connected to each other. The memory is configured to store a computer program. The computer program includes program instructions. The processor is configured to invoke the program instructions, to perform the method according to any one of the third aspect or the possible embodiments of the third aspect.

According to a thirteenth aspect, an embodiment of this application provides a communication system, including a first device and a second device.

The first device is configured to send a first message. The first message includes one or more of the following parameters: a first parameter, a second parameter, and a third parameter. The first parameter is used to indicate that the first message is a message for requesting to be provided an interactive business service. The second parameter is used to indicate an identifier corresponding to the interactive business service that can be provided by the first device. The third parameter is used to indicate a processing capability required by the first device for the interactive business service.

The second device is configured to receive the first message. The second device determines, based on the first message, whether the second device can provide the interactive business service for the first device. The second device sends a second message to the first device when the second device determines that the second device can provide the interactive business service for the first device.

According to a fourteenth aspect, an embodiment of this application provides a device, including a processor, an input device, an output device, and a memory. The processor, the input device, the output device, and the memory are connected to each other. The memory is configured to store a computer program. The computer program includes program instructions. The processor is configured to invoke the program instructions, to perform the method according to any one of the fifth aspect or the possible embodiments of the fifth aspect.

According to a fifteenth aspect, an embodiment of this application provides a device, including a processor, an input device, an output device, and a memory. The processor, the input device, the output device, and the memory are connected to each other. The memory is configured to store a computer program. The computer program includes program instructions. The processor is configured to invoke the program instructions, to perform the method according to any one of the sixth aspect or the possible embodiments of the sixth aspect.

According to a sixteenth aspect, an embodiment of this application provides a communication system, including a first device and a second device. The first device is configured to send a first message. The first message is used to request to establish a connection to the second device. The first message includes one or more of the following parameters: a first parameter and a second parameter. The first parameter is used to indicate to request to provide an interactive business service. The second parameter is used to indicate a processing capability that the second device needs to have for the interactive business service. The first device is further configured to receive a second message. The second message is used to indicate that the second device accepts establishment of the connection to the first device.

According to a seventeenth aspect, an embodiment of this application provides a communication system, including a first device and a second device.

The first device is configured to send a first request message to a first network device. The first request message includes a processing capability that can be provided for an interactive business service. The first device is further configured to receive a first parameter sent by the first network device. The first parameter is a processing capability that can be provided by the first device for the interactive business service. The first device sends a first broadcast message. The first broadcast message includes the first parameter.

The second device is configured to send a second request message to a second network device. The second request message includes a required processing capability for the interactive business service. The second device is further configured to: receive a first filter sent by the second network device; receive the first broadcast message; and determine that the first parameter matches the first filter. The second device communicates with the first device.

According to an eighteenth aspect, an embodiment of this application provides a communication system, including a first device and a second device.

The first device is configured to send a second request message to a first network device. The second request message includes a required processing capability for an interactive business service. The first device is further configured to receive a second parameter sent by the first network device. The second parameter is a processing capability required by the first device for the interactive business service. The first device is further configured to send a first broadcast message. The first broadcast message includes the second parameter.

The second device is configured to send a second request message to a second network device. The second request message includes a processing capability that can be provided for the interactive business service. The second device is further configured to receive a second filter sent by the second network device. The second device is further configured to: receive the first broadcast message; determine that the second parameter matches the second filter; and communicate with the first device.

DESCRIPTION OF EMBODIMENTS

The following clearly and completely describes the technical solutions in embodiments of this application with reference to the accompanying drawings in embodiments of this application. It is clear that the described embodiments are merely some but not all of embodiments of this application. All other embodiments that may be obtained by a person of ordinary skill in the art based on embodiments of this application shall fall within the protection scope of this application.

Figure 1:
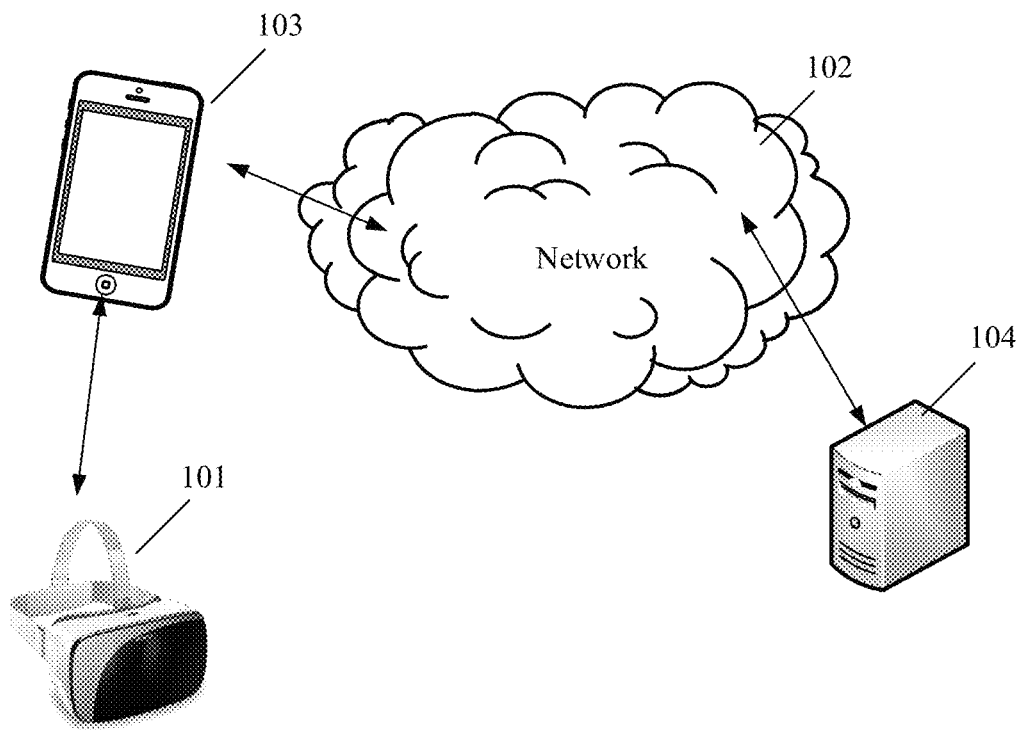
FIG. 1 is a schematic diagram of an architecture in a scenario in which an inter-device communication method according to this application is used.

FIG. 1 is a schematic diagram of an architecture in a scenario in which an inter-device communication method according to this application is used. In this scenario, a VR head mounted device 101 obtains, from a network 102 through a smartphone 103, an interactive business (for example, watching, through the VR head mounted device, an augmented reality (AR) or VR video, or a cloud game that is sent from a cloud) provided by an application server 104. Alternatively, the VR head mounted device 101 obtains, through the smartphone 103, an interactive business (for example, watching, through the VR head mounted device, an AR or VR video locally stored in the smartphone) provided by the smartphone. The VR head mounted device 101 is lightweight. When the VR head mounted device 101 is used, a device, for example, the smartphone 103, is required to provide a service, for example, rendering, compression, or decompression. Therefore, the VR head mounted device 101 expects to communicate with the smartphone 103. To achieve this objective, this application provides an inter-device communication method. The method includes: A first device sends a first message. The first message includes one or more of the following parameters: a first parameter, a second parameter, and a third parameter. The first parameter is used to indicate that the first message is a message for announcing provision of an interactive business service. The second parameter is used to indicate an identifier corresponding to the interactive business service that can be provided by the first device. The third parameter is used to indicate one or more of a processing capability that can be provided by the first device for the interactive business service or a processing capability of the first device for the interactive business service. A second device receives the first message. The second device determines, based on the first message, whether the first device can provide the interactive business service for the second device. The second device communicates with the first device when the second device determines that the first device can provide the interactive business service for the second device. Specifically, the smartphone 103 may be the first device, and the VR head mounted device 101 may be the second device. The smartphone 103 may send the first message to the VR head mounted device 101. The first message may include the first parameter. Alternatively, the first message may include the second parameter. Alternatively, the first message may include the third parameter. Alternatively, the first message includes the first parameter and the second parameter. Alternatively, the first message includes the second parameter and the third parameter. Alternatively, the first message includes the first parameter and the third parameter. Alternatively, the first message includes the first parameter, the second parameter, and the third parameter. The VR head mounted device 101 receives the first message, and determines, based on the first message, whether the first device can provide a required interactive business service for the VR head mounted device 101. If the VR head mounted device 101 determines that the smartphone 103 can provide a service for an interactive business required by the VR head mounted device 101, the VR head mounted device 101 discovers the smartphone 103, that is, the VR head mounted device 101 establishes a reliable communication connection to the smartphone 103, and the smartphone 103 provides the service for the interactive business for the VR head mounted device 101.

In some possible implementations, during inter-device communication, alternatively, the VR head mounted device 101 may send a requirement message. After receiving the message sent by the VR head mounted device 101, the smartphone 103 that can provide a service may send a message to the VR head mounted device 101 based on a service that may be provided by the smartphone 103. The message may indicate that the service cannot be provided, or may indicate that the service can be provided, or the message may indicate that the service can be provided and specific information of the service that can be provided by the smartphone 103 is sent to the VR head mounted device 101. The VR head mounted device 101 determines, based on feedback information of the smartphone, whether the smartphone 103 provides a service for an interactive business for the VR head mounted device 101. Therefore, this application further provides an inter-device communication method. The method includes: A first device sends a first message. The first message includes one or more of the following parameters: a first parameter, a second parameter, and a third parameter. The first parameter is used to indicate that the first message is a message for requesting to be provided an interactive business service. The second parameter is used to indicate an identifier corresponding to the interactive business service required by the first device. The third parameter is used to indicate one or more of a processing capability that can be provided by the first device for the interactive business service or a processing capability of the first device for the interactive business service. A second device receives the first message. The second device determines, based on the first message, whether the second device can provide the interactive business service for the first device. The second device sends a second message to the first device when the second device determines that the second device can provide the interactive business service for the first device. The first device may determine, based on the received second message, whether to establish a reliable communication connection to the second device.

It should be noted that, in some possible embodiments, the smartphone 103 may send, to a first network device, a service that can be provided by the smartphone 103. The VR head mounted device 101 may send, to a second network device, a service required by the VR head mounted device 101. The first network device and the second network device determine, based on received information, whether the smartphone 103 provides the service for the VR head mounted device 101. It may be understood that the first network device and the second network device may be different network devices or a same network device.

It should be noted that, in some possible embodiments, when the smartphone 103 interacts with the VR head mounted device 101, specific information of the service that can be provided by the smartphone 103 may be sent to the VR head mounted device 101, or specific information of the service required by the VR head mounted device 101 may be sent to the smartphone 103. To be specific, during initial interaction, one party sends specific capability information or requirement information, and the other party determines, based on the received information and a requirement or a capability of the other party, whether the two parties establish a reliable connection for communication. It should be noted that one device discovering another device means that the device establishes a reliable connection to the another device in subsequent communication.

It should be noted that, to reduce an amount of data transmitted at a time, in some possible embodiments, when the smartphone 103 interacts with the VR head mounted device 101, a part of information about the service that can be provided by the smartphone 103 may be sent to the VR head mounted device 101. Alternatively, a part of information about the service required by the VR head mounted device 101 may be sent to the smartphone 103. To be specific, during the initial interaction, one party sends a part of capability information or requirement information, the other party may first establish a connection to the other party based on the received information and a requirement or a capability of the other party, and then, detailed capability information or requirement information is exchanged in subsequent interaction. If requirements of each other are met, a reliable connection is established. If requirements of each other are not met, the previously established connection may be disconnected. In other words, the connection that is initially established is unreliable, and the reliable connection can be further established only when the requirements of each other are met.

It should be noted that the interactive business in the present invention refers to a business, for example, AR, VR, or a cloud game. Because this type of business requires a large amount of rendering, compression, and decompression processing, the interactive business service refers to a service provided by a terminal for another terminal. To be specific, processing such as rendering, compression, and decompression is performed on data of an interactive business for the another terminal, and then obtained data is sent to the another terminal, to reduce rendering, compression, and decompression processing performed by the another terminal. It should be noted that, in the present invention, the second device communicating with the first device may be understood as: the second device completes a discovery process with the first device, or the second device starts to initiate a connection establishment process with the first device, that is, sends a connection establishment request message or a communication request message to the first device, or data transmission is started between the second device and the first device.

Figure 2:
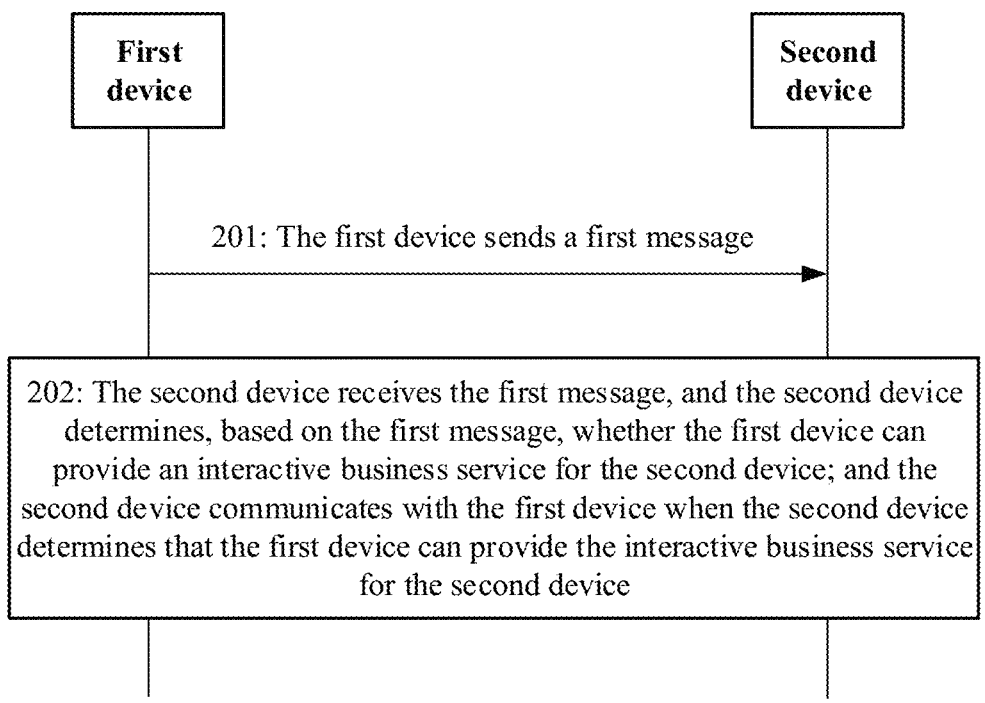
FIG. 2 is a schematic diagram of an interaction procedure of an inter-device communication method according to an embodiment of this application.

FIG. 2 is an interaction flowchart of a communication method according to an embodiment of this application. The inter-device communication method shown in FIG. 2 includes the following operations.

Operation 201: A first device sends a first message. The first message includes one or more of the following parameters: a first parameter, a second parameter, and a third parameter. The first parameter is used to indicate that the first message is a message for announcing provision of an interactive business service. The second parameter is used to indicate an identifier corresponding to the interactive business service that can be provided by the first device. The third parameter is used to indicate one or more of a processing capability that can be provided by the first device for the interactive business service or a processing capability of the first device for the interactive business service.

It should be noted that the first message may be a discovery message. To be specific, the first message is used by another device to discover the first device.

The first parameter may be specifically a message type of the first message. When a value of the message type is a specific value (for example, 0000, 0001, or 1000), it indicates that the first message is a message for announcing provision of an interactive business service.

The second parameter may be specifically a code word. For example, 00 indicates that a VR interactive business service may be provided, and 01 indicates that an AR interactive business service may be provided.

For the third parameter, the processing capability that can be provided for the interactive business service specifically includes a processing capability that can be currently provided by a device, and specifically includes a value of a rendering level (for example, a level 1, a level 2, or a level 3) that can be processed, or may include a compression ratio (for example, 20:1 or 10:1), a compression or decompression speed (for example, x Mb/s), and the like. The processing capability of the first device for the interactive business service refers to a processing capability that the first device has, namely, a maximum processing capability. Considering that one device may provide an interactive business service for a plurality of devices at the same time, a processing capability that can be provided by the device for the interactive business service may be a processing capability of the device for the interactive business service, or may be less than the processing capability of the device for the interactive business service. The first device may directly include the third parameter in the first message for sending, or may encapsulate the third parameter in an application level container for sending by using the first message. The foregoing three parameters may be independent parameters, or may be different fields in one parameter. A specific implementation is not specifically limited in the present invention.

Operation 202: A second device receives the first message, and the second device determines, based on the first message, whether the first device can provide the interactive business service for the second device; and the second device communicates with the first device when the second device determines that the first device can provide the interactive business service for the second device.

It should be noted that the second device communicating with the first device may be understood as: the second device completes a process of discovering the first device, or the second device starts to initiate a connection establishment process with the first device, that is, sends a connection establishment request message or a communication request message to the first device, or data transmission is started between the second device and the first device.

In some possible embodiments, the first message further includes a quality of service (QoS) parameter. The QoS parameter is used to indicate a QoS capability that can be provided by the first device on a bypass interface (PC5). The bypass interface is an interface between the first device and the second device.

It should be noted that the QoS parameter may include a PC5 5G QoS identifier (PQI), a PC5 flow bit rate, a PC5 link aggregated bit rate, and the like, and specifically indicates highest QoS provided on the bypass interface.

In some possible embodiments, the first message further includes an identifier of a first application. The identifier of the first application is used to indicate that the first terminal can provide the interactive business service for the first application.

It should be noted that, when the first application is started, the first device starts to send the first message.

In some possible embodiments, the method further includes: The first device receives a second message sent by the second device. The second message is used by the second device to request to establish a connection to the first device. The second message includes one or more of the following: a fourth parameter, where the fourth parameter is used to indicate one or more of a processing capability required by the second device for the interactive business service or a processing capability of the second device for the interactive business; and an identifier of a second application, where the identifier of the second application is used to indicate that the second device requests to establish a connection for the second application.

It should be noted that, when the second application is started, the second device starts to listen to the first message.

The first device sends a third message to the second device. The third message is used by the first device to accept establishment of the connection to the second device.

In some possible embodiments, the method further includes: The first device receives the second parameter sent by a network device. Specifically, the second parameter may be preconfigured on the first device by the network device, or may be obtained after the first device performs signaling interaction with the network device before sending the first message. The network device may be a 5G policy control function (PCF) or another core network device. This is not specifically limited herein.

In some possible embodiments, the first device sends a first request message to the network device. The first request message is used to obtain the second parameter from the network device.

In some possible embodiments, the second device receives the first message, and the second device determines, based on the first message, whether the first device can provide the interactive business service for the second device. The second device communicates with the first device when the second device determines that the first device can provide the interactive business service for the second device. The first message includes one or more of the following parameters: the first parameter, the second parameter, and the third parameter. The first parameter is used to indicate that the first message is a message for announcing provision of an interactive business service. The second parameter is used to indicate the identifier corresponding to the interactive business service that can be provided by the first device. The third parameter is used to indicate one or more of the processing capability that can be provided by the first device for the interactive business service or the processing capability of the first device for the interactive business service.

In some possible embodiments, that the second device determines, based on the first message, that the first device can provide the interactive business service for the second device includes one or more of the following:

the second device determines, based on the first parameter, that the first message is a message for announcing provision of the interactive business service;

the second device determines, based on the second parameter, that the interactive business service that can be provided by the first device matches an interactive business service required by the second device, that is, the identifier of the interactive business service that can be provided is the same as or partially the same as an identifier of the required interactive business service;

the second device determines, based on the third parameter, that the processing capability that can be provided by the first device for the interactive business service matches the processing capability required by the second device for the interactive business service, that is, the processing capability that can be provided is greater than or equal to the required processing capability;

the second device determines, based on the QoS parameter, that the QoS capability that can be provided by the first device on the bypass interface matches a QoS capability required by the second device on the bypass interface, that is, QoS that can be provided is greater than or equal to required QoS; and the second device determines, based on the identifier of the first application, that an application for which the first device can provide an interactive business service matches an application of the interactive business service required by the second device, that is, identifiers of the applications are the same or some content in the identifiers is the same.

In some possible embodiments, the method further includes: The second device sends the second message to the first device. The second message is used by the second device to request to establish the connection to the first device. The second message includes one or more of the following: the fourth parameter, where the fourth parameter is used to indicate one or more of the processing capability required by the second device for the interactive business service or the processing capability of the second device for the interactive business service; and the identifier of the second application, where the identifier of the second application is used to indicate that the second device requests to establish the connection for the second application.

The first device sends the third message to the second device. The third message is used by the first device to accept the establishment of the connection to the second device.

In some possible embodiments, the method further includes: The second device sends a second request message to the network device. The second request message is used to obtain, from the network device, the required processing capability for the interactive business service.

In some possible embodiments, the method further includes: The second device receives a filter sent by the network device. The second device receives the second parameter sent by the network device. The second device determines, based on the filter, that the second parameter matches the filter.

Figure 3:
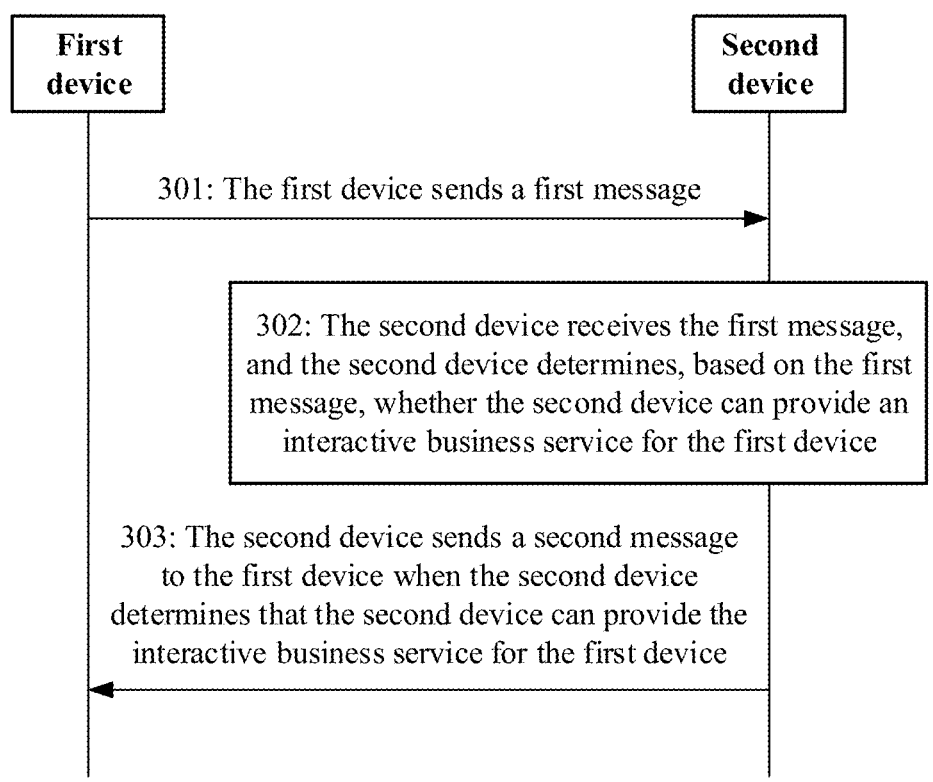
FIG. 3 is a schematic diagram of an interaction procedure of an inter-device communication method according to another embodiment of this application.

FIG. 3 is an interaction flowchart of a communication method according to an embodiment of this application. An inter-device communication method shown in FIG. 3 includes the following operations.

Operation 301: A first device sends a first message. The first message includes one or more of the following parameters: a first parameter, a second parameter, and a third parameter. The first parameter is used to indicate that the first message is a message for requesting to be provided an interactive business service. The second parameter is used to indicate an identifier corresponding to the interactive business service required by the first device. The third parameter is used to indicate one or more of a processing capability required by the first device for the interactive business service or a processing capability that the first device has for an interactive business.

It should be noted that the first message may be a broadcast message or a unicast message. To be specific, the first message is used by another device to learn of a requirement of the first device after the another device listens to and obtains the first message. The first message may be specifically a discovery message, or may be a connection establishment request message or a communication request message.

The first parameter may be specifically a message type of the first message. When a value of the message type is a specific value (for example, 0000, 0001, or 1000), it indicates that the first message is a message for announcing a request for provision of an interactive business service.

The second parameter may be specifically a code word. For example, 00 indicates that a VR interactive business service may be provided, and 01 indicates that an AR interactive business service may be provided.

For the third parameter, the processing capability that needs to be provided for the interactive business service specifically includes a processing capability that is required by the first device to be provided by another device, and specifically includes a value of a rendering level (for example, a level 1, a level 2, or a level 3) that needs to be provided, or may include a required compression ratio (for example, 20:1 or 10:1), a required compression or decompression speed (for example, x Mb/s), and the like. The processing capability for the required interactive business service for the first device refers to a minimum processing capability required by the first device. The another device that provides the processing capability for the interactive business service may have a processing capability greater than that required by the first device, but the capability corresponding to the third parameter is at least met. The processing capability of the first device for the interactive business service refers to a processing capability that the first device has, namely, a maximum processing capability. The foregoing three parameters may be independent parameters or different fields in one parameter. A specific implementation is not specifically limited in the present invention.

Operation 302: A second device receives the first message, and the second device determines, based on the first message, whether the second device can provide the interactive business service for the first device.

If the second device determines, based on the first message, that an interactive business service that can be provided by the second device matches the interactive business service required by the first device, that is, an identifier of the interactive business that can be provided is the same as or partially the same as that of the required interactive business service, the second device may determine that the second device can provide the required interactive business for the first device. Otherwise, the second device may determine that the second device cannot provide the required interactive business service for the first device. If the second device determines, based on the first message, that a processing capability that can be provided by the second device for the interactive business service meets or is greater than the processing capability that is required by the first device for the interactive business service and that is indicated in the first message, the second device may determine that the second device can provide the required interactive business service for the first device, which is specifically determined by the second device based on the third parameter in the first message and the capability that can be currently provided by the second device.

If the second device determines, based on the first message, that a processing capability that can be provided by the second device for an interactive business service is less than the processing capability that is required by the first device for the interactive business service and that is indicated in the first message, the second device may determine that the second device cannot provide the required interactive business service for the first device, which is specifically determined by the second device based on the third parameter in the first message and a capability that can be currently provided by the second device.

Operation 303: The second device sends a second message to the first device when the second device determines that the second device can provide the interactive business service for the first device.

In some possible embodiments, the first message further includes a quality of service (QoS) parameter. The QoS parameter is used to indicate a QoS capability required by the first device on a bypass interface. The bypass interface is an interface between the first device and the second device.

It should be noted that the QoS parameter may include a PC5 5G QoS identifier (PQI), a PC5 flow bit rate, a PC5 link aggregated bit rate, and the like, and specifically indicates a lowest QoS requirement on the bypass interface.

In some possible embodiments, the first message further includes an identifier of a first application. The identifier of the first application is used to indicate that the interactive business service required by the first terminal is provided for the first application.

It should be noted that, when the first application is started, the first device starts to send the first message.

In some possible embodiments, the method further includes: The first device sends a third message to the second device. The third message is used to indicate that the first device requests to establish a connection to the second device. The third message includes one or more of the following: a fourth parameter and an identifier of a second application. The fourth parameter is used to indicate the processing capability required by the first device for the interactive business service. The identifier of the second application is used to indicate that the second device provides the interactive business service by using the second application. The second device sends a fourth message to the first device. The fourth message is used by the second device to accept establishment of the connection to the first device.

It should be noted that, when the second application is started, the second device starts to listen to the first message.

In some possible embodiments, that the second device determines, based on the first message, that the second device can provide the interactive business service for the first device includes one or more of the following:

the second device determines, based on the first parameter, that the first message is a message for requesting to be provided the interactive business service;

the second device determines, based on the second parameter, that the interactive business service that can be provided by the second device matches the interactive business service required by the first device, that is, the identifier of the interactive business that can be provided includes the identifier of the required interactive business;

the second device determines, based on the third parameter, that the processing capability that can be provided by the second device for the interactive business service matches the processing capability required by the first device for the interactive business service, that is, the processing capability that can be provided is greater than or equal to the required processing capability;

the second device determines, based on the QoS parameter, that a QoS capability that can be provided by the second device on the bypass interface matches the QoS capability required by the first device on the bypass interface, that is, QoS that can be provided is greater than or equal to required QoS; and the second device determines, based on the identifier of the first application, that an application for which the second device can provide the interactive business service matches an application of the interactive business service required by the first device, that is, the identifier of the interactive business service that can be provided includes the identifier of the required interactive business service.

In some possible embodiments, the second device sends the second message to the first device. The second message includes a fourth parameter. The fourth parameter is used to indicate that the second message is a response message indicating that the interactive business service can be provided.

In some possible embodiments, the method further includes:

the second device sends the fourth message to the first device, where the fourth message is used by the second device to accept the establishment of the connection to the first device.

Another inter-device communication method provided in this application includes the following operations.

Operation 401: A first device sends a first message. The first message is used to request to establish a connection to a second device. The first message includes one or more of the following parameters: a first parameter and a second parameter. The first parameter is used to indicate to request to provide an interactive business service. The second parameter is used to indicate one or more of a processing capability that the second device needs to have for the interactive business service or a processing capability of the first device for the interactive business. The first parameter may be specifically indication information. When a value of the indication information is a specific value, for example, when the value is 1, it indicates to request to provide the interactive business service, or when the value is 0, it indicates not to request to provide the interactive business service. Further, the first parameter may alternatively be a code word. For example, 00 indicates that a VR interactive business service may be provided, and 01 indicates that an AR interactive business service may be provided. A possible implementation of the first parameter may be one of the foregoing implementations (namely, one of the indication information and the code word) or a combination of a plurality of implementations (that is, include both the indication information and the code word). This is not specifically limited in the present invention. A possible implementation of the second parameter is the same as that of the third parameter in step 301. Details are not described herein again.

Operation 402: The first device receives a second message. The second message is used to indicate that the second device accepts establishment of the connection to the first device.

It should be noted that the second device determines, based on the first message, to establish the connection to the first device. Specific logic is the same as that in step 302. Details are not described herein again.

In some possible embodiments, the first message further includes one or more of the following parameters: a third parameter and an identifier of a first application. The third parameter is used to indicate an identifier corresponding to the interactive business service required by the first device. The identifier of the first application is used to indicate that the interactive business service is provided for the first application.

Implementations of the third parameter and the identifier of the first application are the same as those in step 303. Details are not described herein again.

In some possible embodiments, the second message further includes one or more of the following parameters: a fourth parameter and an identifier of a second application. The fourth parameter indicates a processing capability that can be provided by the second device for the interactive business service. The identifier of the second application is used to indicate that the second device can provide the interactive business service for the second application. When the second device can provide a service for an interactive business for the first device, the identifier of the second application includes the identifier of the first application.

In some possible embodiments, the method further includes: The first device sends a third message when determining, based on the second message, to establish the connection to the second device.

In some possible embodiments, the method further includes: The first device sends a first request message to a first network device. The first request message includes the processing capability that needs to be provided for the interactive business service. The first device receives the first parameter sent by the network device. The first device sends a first broadcast message. The first broadcast message includes the first parameter. The second device sends a second request message to a second network device. The second request message includes the processing capability that can be provided for the interactive business service. The second device receives a first filter sent by the second network device. The second device receives the first broadcast message, and determines that the first parameter matches the first filter. The second device communicates with the first device.

Another inter-device communication method provided in this application includes the following operations.

Operation 501: A first device sends a first request message to a first network device. The first request message includes one or more of a processing capability that can be provided for an interactive business service or a processing capability that the first device has for an interactive business. A specific possible implementation is the same as that of the third parameter in step 201. Details are not described herein again. If a third parameter is included in an application level container, the first network device forwards the third parameter to a corresponding application server. The first network device may be a 5G policy control function (PCF) or another core network device. This is not specifically limited herein.

Operation 502: The first device receives a first parameter sent by the first network device. The first parameter is an identifier corresponding to the interactive business service that can be provided by the first device. A specific possible implementation is the same as that of the second parameter in step 201. Details are not described herein again.

Operation 503: The first device sends a first broadcast message. The first broadcast message includes the first parameter.

504: A second device sends a second request message to a second network device. The second request message includes one or more of a required processing capability for the interactive business service or a processing capability that the second device has for an interactive business. A specific implementation is the same as that of the third parameter in step 301. This is not specifically limited herein.

Operation 505: The second device receives a second parameter sent by the second network device. The second parameter is used by the second device to determine that the first parameter matches the second parameter, that is, some or all content of the first parameter is the same as some or all content of the second parameter. In an implementation, the second parameter may be a filter.

Operation 506: The second device receives the first broadcast message, and determines that the first parameter matches the second parameter.

Operation 507: The second device communicates with the first device.

It should be noted that the second device communicating with the first device may be understood as: the second device starts to initiate a connection establishment process with the first device, that is, sends a connection establishment request message or a communication request message to the first device, data transmission is started between the second device and the first device, or the like.

Another inter-device communication method provided in this application includes the following operations.

Operation 601: A first device sends a first request message to a first network device. The first request message includes one or more of a processing capability for an interactive business service, a required processing capability for the interactive business service, or a processing capability that can be provided for the interactive business service.

The interactive business service may be a VR interactive business service, an AR interactive business service, or the like.

Operation 602: The first device receives a second parameter sent by the first network device.

Operation 603: The first device sends a first broadcast message. The first broadcast message includes the second parameter.

Operation 604: A second device receives the first broadcast message, and determines, based on the second parameter, to communicate with the first device.

Specifically, the second device may determine, based on the second parameter in the received broadcast message, that a processing capability of the first device for an interactive business service matches a processing capability required by the second device for an interactive business service. Alternatively, the second device may determine, based on the second parameter in the received broadcast message, that a processing capability required by the first device for an interactive business service matches a processing capability provided by the second device for an interactive business service.

In some possible embodiments, the method further includes: The second device sends a second request message to a second network device. The second request message includes one or more of a processing capability for an interactive business service, a processing capability that can be provided for the interactive business service, or a required processing capability for the interactive business service.

In some possible embodiments, the method further includes: The second device receives a third parameter sent by the second network device, and the second device determines, based on the third parameter and the second parameter, to communicate with the first device.

An embodiment of this application further provides a communication system including a first device and a second device. The first device has a function for implementing steps performed by the first device in the foregoing method embodiments. The second device has a function for implementing steps performed by the second device in the foregoing method embodiments. For simplicity, for specific functions of the first device and the second device, refer to the descriptions in the foregoing method embodiments. Details are not described herein again.

An embodiment of this application further provides a device, including a processor, an input device, an output device, and a memory. The processor, the input device, the output device, and the memory are connected to each other. The memory is configured to store a computer program. The computer program includes program instructions. The processor is configured to invoke the program instructions, to perform the device communication method performed by any first device in the foregoing method embodiments. For details, refer to the descriptions in the foregoing method embodiments. Details are not described herein again.

An embodiment of this application further provides a device, including a processor, an input device, an output device, and a memory. The processor, the input device, the output device, and the memory are connected to each other. The memory is configured to store a computer program. The computer program includes program instructions. The processor is configured to invoke the program instructions, to perform the device communication method performed by the second device in the foregoing method embodiments. For details, refer to the descriptions in the foregoing method embodiments. Details are not described herein again.

According to the technical solution provided in this embodiment of this application, the first device that communicates with the second device is a device that can provide a service for an interactive business for the second device. This facilitates more matched interaction between the devices.

An embodiment of this application further provides a computer-readable storage medium. The computer-readable storage medium stores instructions. When the instructions are runs on a device, the device is enabled to perform some or all steps of the inter-device communication method in any one of the foregoing embodiments.

An embodiment of this application further provides a computer program product. When the computer program product runs on a computer, some or all steps of the inter-device communication method in any one of the foregoing embodiments are performed.

The foregoing specific method embodiments, explanations and descriptions of technical features in embodiments, and extensions of a plurality of implementation forms are also applicable to method execution on an apparatus and details are not described in the apparatus embodiments.

It should be understood that, in the specification, claims, and accompanying drawings of the present invention, the identifiers and the like are intended to distinguish between similar objects but do not necessarily indicate a specific order or sequence. It should be understood that data termed in such a way are interchangeable in appropriate circumstances, so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those expressly listed steps or modules, but may include other steps or modules not expressly listed or inherent to such a process, method, system, product, or device.

What is disclosed above is merely preferred embodiments of the present invention, and certainly is not intended to limit the protection scope of the present invention. A person of ordinary skill in the art may understand that all or some of procedures that implement the foregoing embodiments and equivalent modifications made in accordance with the claims of the present invention shall fall within the scope of the present invention.

What is claimed is:

1. An inter-device communication method, comprising:
    sending, by a first device to at least one other device, a first message that comprises one or more of the following parameters: a first parameter, a second parameter, and a third parameter; wherein
    the first parameter indicates that the first message is a message for requesting to be provided an interactive business service by the at least one other device; the second parameter indicates an identifier corresponding to the interactive business service required by the first device and to be provided by the at least one other device; and the third parameter indicates a processing capability of the at least one other device that is required by the first device for the interactive business service requested to be provided; and wherein
    the interactive business service refers to a service provided by the at least one other device, which performs rendering, compression, and decompression on data of an interactive business for the first device.

2. The method according to claim 1, wherein the first message is used by a second device to determine whether the second device can provide the interactive business service for the first device.

3. The method according to claim 2, further comprising:
    receiving, by the first device, a second message sent by the second device, wherein the second message comprises a fourth parameter, and the fourth parameter indicates that the interactive business service can be provided.

4. The method according to claim 1, wherein the method further comprises:
    sending, by the first device, a third message to a second device, wherein the third message indicates that the first device requests to establish a connection to the second device; and
    receiving, by the first device, a fourth message sent by the second device, wherein the fourth message is used by the second device to accept establishment of the connection to the first device.

5. An inter-device communication method, comprising:
    receiving, by a second device from a first device, a first message;
    determining, by the second device based on the first message, whether the second device can provide an interactive business service for the first device; and
    sending, by the second device, a second message to the first device when the second device determines that the second device can provide the interactive business service for the first device; wherein the first message comprises one or more of the following parameters: a first parameter, a second parameter, and a third parameter; wherein the first parameter indicates that the first message is a message for requesting the second device to provide an interactive business service to the first device; the second parameter indicates an identifier corresponding to the interactive business service required by the first device and to be provided by the second device; and the third parameter indicates a processing capability of the second device required by the first device for the interactive business service requested to be provided; and wherein the interactive business service refers to a service provided by the at least one other device, which performs rendering, compression, and decompression on data of an interactive business for the first device.

6. The method according to claim 5, wherein the method further comprises:

receiving, by the second device, a third message sent by the first device, wherein the third message indicates that the first device requests to establish a connection to the second device; and sending, by the second device, a fourth message to the first device, wherein the fourth message is used by the second device to accept establishment of the connection to the first device.

7. The method according to claim 5, wherein the method further comprises:

sending, by the second device, a second message to the first device, wherein the second message comprises a fourth parameter, and the fourth parameter indicates that the interactive business service can be provided.

8. A first device, comprising:

a processor;
an input device;
an output device; and
a memory;
wherein the processor, the input device, the output device, and the memory are connected to each other, the memory is configured to store a computer program, the computer program comprises program instructions, and the processor is configured to invoke the program instructions, to perform operations comprising:

sending a first message to at least one other device that comprises one or more of the following parameters: a first parameter, a second parameter, and a third parameter; wherein the first parameter indicates that the first message is a message for requesting to be provided an interactive business service by the at least one other device; the second parameter indicates an identifier corresponding to the interactive business service required by the first device and to be provided by the at least one other device; and the third parameter indicates a processing capability of the at least one other device that is required by the first device for the interactive business service requested to be provided; and wherein the interactive business service refers to a service provided by the at least one other device, which performs rendering, compression, and decompression on data of an interactive business for the first device.

9. The device according to claim 8, wherein the first message is used by a second device to determine whether the second device can provide the interactive business service for the first device.

10. The device according to claim 9, wherein the operations performed by the processor further comprise:

receiving, by the first device, a second message sent by the second device, wherein the second message comprises a fourth parameter, and the fourth parameter indicates that the interactive business service can be provided.

11. The device according to claim 8, wherein the operations performed by the processor further comprise:

sending, by the first device, a third message to a second device, wherein the third message is used to indicate that the first device requests to establish a connection to the second device; and receiving, by the first device, a fourth message sent by the second device, wherein the fourth message is used by the second device to accept establishment of the connection of to the first device.

12. A second device, comprising:

a processor;
an input device;
an output device; and
a memory;
wherein the processor, the input device, the output device, and the memory are connected to each other, the memory is configured to store a computer program, the computer program comprises program instructions, and the processor is configured to invoke the program instructions, to perform operations comprising:

receiving, by a second device from a first device, a first message;

determining, by the second device based on the first message, whether the second device can provide an interactive business service for the first device; and sending, by the second device, a second message to the first device when the second device determines that the second device can provide the interactive business service for the first device; wherein the first message comprises one or more of the following parameters: a first parameter, a second parameter, and a third parameter; the first parameter indicates that the first message is a message for requesting the second device to provide an interactive business service to the first device; the second parameter indicates an identifier corresponding to the interactive business service required by the first device and to be provided by the second device; and the third parameter indicates a processing capability of the second device required by the first device for the interactive business service requested to be provided; and wherein the interactive business service refers to a service provided by the at least one other device, which performs rendering, compression, and decompression on data of an interactive business for the first device.

13. The device according to claim 12, wherein the operations performed by the processor further comprise:

receiving, by the second device, a third message sent by the first device, wherein the third message indicates that the first device requests to establish a connection to the second device; and sending, by the second device, a fourth message to the first device, wherein the fourth message is used by the second device to accept establishment of the connection to the first device.

14. The device according to claim 12, wherein the operations performed by the processor further comprise:

sending, by the second device, a second message to the first device, wherein the second message comprises a fourth parameter, and the fourth parameter indicates that the interactive business service can be provided.

* * * * *